(12) United States Patent
Chen et al.

(10) Patent No.: US 8,514,939 B2
(45) Date of Patent: Aug. 20, 2013

(54) METHOD AND SYSTEM FOR MOTION COMPENSATED PICTURE RATE UP-CONVERSION OF DIGITAL VIDEO USING PICTURE BOUNDARY PROCESSING

(75) Inventors: Xuemin Chen, San Diego, CA (US); Brian Heng, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 1290 days.

(21) Appl. No.: 11/932,102

(22) Filed: Oct. 31, 2007

(65) Prior Publication Data

US 2009/0110075 A1  Apr. 30, 2009

(51) Int. Cl.
  H04N 7/12       (2006.01)
  H04N 11/02      (2006.01)
  H04N 11/04      (2006.01)

(52) U.S. Cl.
  USPC .................................................... 375/240.16

(58) Field of Classification Search
  None
  See application file for complete search history.

(56) References Cited

U.S. PATENT DOCUMENTS

| | | | | |
|---|---|---|---|---|
| 6,192,079 B1* | 2/2001 | Sharma et al. | | 375/240.16 |
| 8,018,998 B2* | 9/2011 | Li et al. | | 375/240.16 |
| 2004/0101058 A1* | 5/2004 | Sasai et al. | | 375/240.26 |
| 2004/0165662 A1* | 8/2004 | Battistella | | 375/240.01 |
| 2006/0017843 A1* | 1/2006 | Shi et al. | | 348/441 |
| 2006/0039471 A1* | 2/2006 | Dane et al. | | 375/240.16 |
| 2006/0165176 A1* | 7/2006 | Raveendran et al. | | 375/240.16 |
| 2006/0233253 A1* | 10/2006 | Shi et al. | | 375/240.16 |
| 2006/0256238 A1* | 11/2006 | Mishima et al. | | 348/459 |
| 2007/0014477 A1* | 1/2007 | MacInnis et al. | | 382/236 |
| 2007/0133685 A1* | 6/2007 | Seong et al. | | 375/240.16 |
| 2007/0230563 A1* | 10/2007 | Tian et al. | | 375/240.01 |
| 2008/0165851 A1* | 7/2008 | Shi et al. | | 375/240.16 |
| 2008/0317128 A1* | 12/2008 | Zhou et al. | | 375/240.16 |
| 2009/0268823 A1* | 10/2009 | Dane et al. | | 375/240.27 |
| 2010/0226436 A1* | 9/2010 | Dane et al. | | 375/240.16 |
| 2011/0129015 A1* | 6/2011 | Nguyen et al. | | 375/240.16 |

* cited by examiner

*Primary Examiner* — Suk Jin Kang

(74) *Attorney, Agent, or Firm* — Thomas | Horstemeyer, LLP

(57) ABSTRACT

Certain aspects of a method and system for motion-compensated picture rate up-conversion (PRUC) of digital video using picture boundary processing may include generating one or more forward motion vectors and one or more backward motion vectors based on extracted picture rate up-conversion (PRUC) data. A cost of performing motion estimation of a particular block along the generated forward motion vectors and the generated backward motion vectors corresponding to the particular block may be calculated. The particular block may be a boundary block. A motion vector with the least cost may be selected and motion compensated to generate a plurality of interpolated pictures.

23 Claims, 10 Drawing Sheets

METHOD AND SYSTEM FOR MOTION COMPENSATED PICTURE RATE UP-CONVERSION OF DIGITAL VIDEO USING PICTURE BOUNDARY PROCESSING

CROSS-REFERENCE TO RELATED APPLICATIONS/INCORPORATION BY REFERENCE

None

FIELD OF THE INVENTION

Certain embodiments of the invention relate to digital video processing. More specifically, certain embodiments of the invention relate to a method and system for motion-compensated picture rate up-conversion (PRUC) of digital video using picture boundary processing.

BACKGROUND OF THE INVENTION

A major revolution in video display technology includes flat screens based on either liquid crystal display (LCD) or plasma display panel (PDP) technology that are rapidly replacing the cathode ray tube (CRT) technology that served as the primary display device for more than a half a century. A significant consequence of the new video display technologies is that pictures may now be displayed at higher picture-rates with progressive scanning on a flat screen. The new video display technologies may also facilitate a faster transition from standard definition television (SDTV) to high-definition television (HDTV). However, legacy video compression systems still use formats with lower picture-rates and may be unable to optimally display legacy video on modern display screens.

There may be restrictions on channel capacity that may affect the display of low picture-rate pictures. For example, considering a 30 Hz video sequence that may be broadcast over a mobile network, the terminals, for example, mobile phones may receive an encoded video sequence from a server. However, due to bandwidth limitations, only a low bit-rate video sequence may be communicated. As a result, the encoder may remove two out of every three pictures to be transmitted, resulting in a sequence with a picture rate of about 10 Hz, for example. The terminal may be capable of displaying video at 30 Hz but since it receives a 10 Hz video, it may have to perform some form of picture-rate conversion.

The available channel capacity may be different in diverse video services. The legacy systems may be different in different regions of the world, for example, NTSC, SECAM or PAL. The picture rate requirements may differ depending on applications and users. Picture-rate conversion may be required in a plurality of applications in order to adapt to a wide variety of display systems. The video picture rate up-conversion may be divided into one or more categories, for example, conversion from interlace to progressive scan or 50/60 Hz interlace to 50/60 Hz progressive, picture rate doubling, for example, 50 Hz to 100 Hz or 60 Hz to 120 Hz, non-integer scan rate conversion, for example, 50 Hz to 60 Hz.

An artifact known as "motion judder" may occur when the picture rate of a video sequence is excessively low. Motion judder may occur when the temporal sampling rate is too low to describe motion in a scene. The objects in input pictures may be shifted on either side of a required output picture. A temporal digital filter interpolation method may be used to determine pixel intensity values. The signals describing motion of each of the objects within a scene may be referred to as motion vectors. Each pixel or region with the same movement may be allocated a motion vector. The motion estimation system may determine these motion vectors and failing to find a correct motion vector and/or misusing the motion vector in a picture rate converter may lead to noticeable artifacts. When large camera movements occur, regions of a picture close to the borders may have significantly less reliable motion vectors than those closer to the middle and special processing may be required at the picture boundaries.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for motion-compensated picture rate up-conversion (PRUC) of digital video using picture boundary processing, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

BRIEF DESCRIPTION OF SEVERAL VIEWS OF THE DRAWINGS

FIG. 7 is a flowchart illustrating exemplary steps for motion-compensated picture rate up-conversion (PRUC) of

DETAILED DESCRIPTION OF THE INVENTION

Certain embodiments of the invention may be found in a system and/or method for motion-compensated picture rate up-conversion (PRUC) of digital video using picture boundary processing. Certain aspects of a method may comprise generating one or more forward motion vectors and one or more backward motion vectors based on extracted picture rate up-conversion (PRUC) data in order to process video data along borders or outer edges of the pictures. A cost of performing motion estimation of a particular block along the generated forward motion vectors and the generated backward motion vectors corresponding to the particular block may be calculated. A motion vector with the least cost may be selected and motion compensated to generate a plurality of interpolated pictures in order to compensate for poor quality of motion estimation that may result in boundary regions as content may enter and/or exit a scene at boundary points and motion estimation at the boundary points may be difficult.

Figure 1:
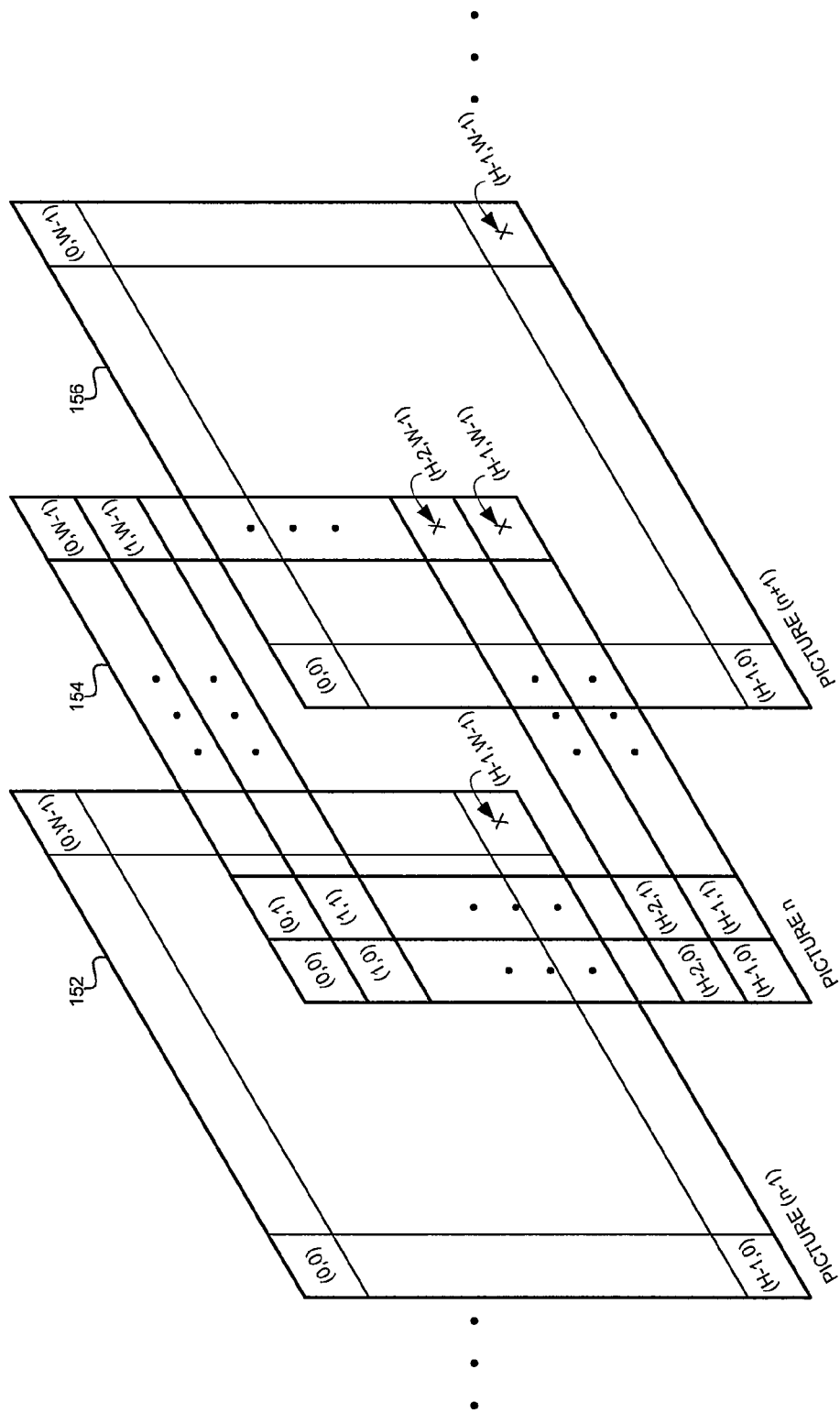
FIG. 1 is a diagram illustrating exemplary consecutive video pictures for noise reduction operations, in connection with an embodiment of the invention.

FIG. 1 is a diagram illustrating exemplary consecutive video pictures for noise reduction operations, in connection with an embodiment of the invention. Referring to FIG. 1, there is shown a current video picture 154, a previous video picture 152, and a next video picture 156. The previous video picture 152 or PICTURE (n−1) may correspond to an immediately previous picture to the current video picture 154. The next video picture 156 or PICTURE (n+1) may correspond to an immediately next picture to the current video picture 154. The previous video picture 152, the current video picture 154, and/or the next video picture 156 may be processed directly from an video input stream or after being buffered by a video processor. The current video picture 154, the previous video picture 156, and the next video picture 158 may comprise luma (Y) and/or chroma (Cb, Cr) information. In instances where video fields are utilized as pictures, the previous video picture 152 may refer to the previous field of the same parity as the current video picture 154, and the next video picture 156 may refer to the next field of the same parity as the current picture 154. The previous, current and next video fields of the same parity may be referred to as consecutive video pictures.

Pixels in consecutive video pictures are said to be collocated when having the same picture location, that is, . . . , $P_{n-1}(x,y), P_n(x,y), P_{n+1}(x,y), \ldots$, where $P_{n-1}$ indicates a pixel value in the previous video picture 152, $P_n$ indicates a pixel value in the current video picture 154, $P_{n+1}$ indicates a pixel value in the next video picture 156, and (x,y) is the common picture location between pixels. The picture location, (x,y) may be such that x=0, 1, . . . , W−1 and y=0, 1, . . . , H−1, where W is the picture width and H is the picture height, for example.

Figure 2:
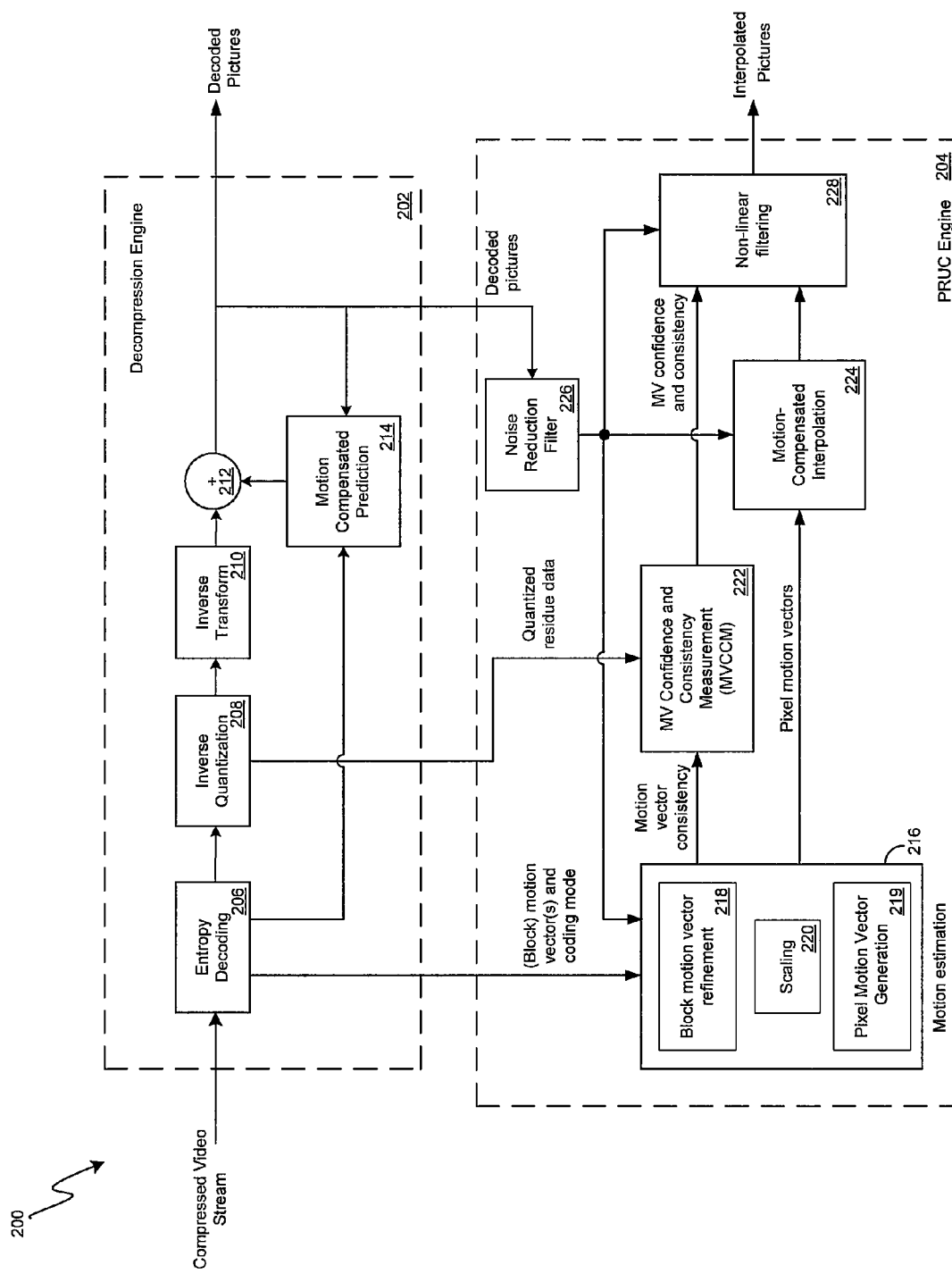
FIG. 2 is a block diagram of an exemplary picture rate up-conversion system and a decompression engine, in accordance with an embodiment of the invention.

FIG. 2 is a block diagram of an exemplary picture rate up-conversion system and a decompression engine, in accordance with an embodiment of the invention. Referring to FIG. 2, there is shown a video decoding system 200. The video decoding system 200 may comprise a decompression engine 202 and a picture rate up-conversion (PRUC) engine 204. The decompression engine 202 may comprise an entropy decoder 206, an inverse quantization block 208, an inverse transform block 210, a summer 212 and a motion compensated prediction block 214.

The PRUC engine 204 may comprise a motion estimation block 216, a motion vector confidence and consistency measurement (MVCCM) block 222, a motion compensated interpolation block 224, a noise reduction filer 226 and a non-linear filtering block 228. The motion estimation block 216 may comprise a block motion vector refinement block 218, a scaling block 220 and a pixel motion vector generation block 219.

The decompression engine 202 may be a video decoder associated with a particular video standard, for example, MPEG-2, H.264/MPEG-4 AVC, VC1 and VP6. The entropy decoder 206 may comprise suitable logic, circuitry and/or code that may be enabled to receive a compressed video stream from a video encoder, for example, encoder 118. The entropy decoder 206 may be enabled to decode the received compressed video stream corresponding to a particular video standard, for example, MPEG-2, H.264/MPEG-4 AVC, VC1 and VP6. The entropy decoder 206 may be enabled to generate block motion vectors based on decoding the received compressed video stream.

The inverse quantization block 208 may comprise suitable logic, circuitry and/or code that may be enabled to generate quantized residue data. The inverse transform block 210 may comprise suitable logic, circuitry and/or code that may be enabled to generate reconstructed residual pixels to the summer 212.

The motion compensated prediction block 214 may comprise suitable logic, circuitry and/or code that may be enabled to receive one or more motion vectors from the entropy decoder 206 to generate a motion compensated block of pixels. The summer 212 may be enabled to add the motion compensated block of pixels to the reconstructed residual pixels to generate one or more decoded pictures. One or more decoded pictures may be fed back to the motion compensated prediction block 214. The motion compensated prediction block 214 may be enabled to generate the motion compensated block of pixels from a reference image or a previous output picture based on receiving one or more motion vectors from the entropy decoder 206.

The PRUC engine 204 may be enabled to extract information, for example, motion vectors, picture and macroblock coding types and quantized residue data from the video decompression engine 202.

The noise reduction filter 226 may comprise suitable logic, circuitry and/or code that may be enabled to receive a plurality of decoded pictures from the decompression engine 202. The noise reduction filter 226 may be enabled to perform de-blocking, de-ringing, or other noise reduction filtering on the received decoded pictures. The noise reduction filter 226 may generate a filtered output to the pixel motion vector generation block 216, the motion compensated interpolation block 224 and the non-linear filtering block 228.

Blockiness artifact may be caused by distorting the distribution or spectrum of the block transform domain by a quantizer. The blockiness artifact may be related to a lower spectrum coefficient or frequency distortion by the quantization. The blockiness artifact may be visible on the block boundaries, for example, 8×8 pixels for MPEG 1, 2 and 4 and both 4×4 pixels and 8×8 pixels for MPEG4 part10 AVC, for example. The blockiness artifact may be perceived in flat texture areas in a given picture or video, for example.

The ringing encoding artifact may be also referred to as a mosquito artifact and may be caused by distorting the distribution and/or spectrum of the block transform domain, by a quantizer. The ringing encoding artifact may be related to a higher spectrum coefficient or frequency distortion by the quantization. The ringing encoding artifact may be visible on edges or text boundaries with a flat texture area, for example.

The motion estimation block 216 may comprise suitable logic, circuitry and/or code that may be enabled to receive extracted block motion vectors and coding modes from the entropy decoder 206. The motion estimation block 216 may be enabled to determine local block motion vectors and a global motion vector and determine the interpolation and filtering modes. The motion estimation block 216 may be enabled to accumulate the plurality of block motion vectors in order to estimate a global motion vector (GMV). The motion estimation block 216 may be enabled to sort motion vectors into a histogram and generate the GMV.

The block motion vector refinement block 218 may comprise suitable logic, circuitry and/or code that may be enabled to refine the motion vectors extracted from the compression video stream and decompose the block motion vectors into pixel motion vectors. The block motion vector refinement block 218 may be enabled to perform a local refinement search and the motion vectors may be refined to sub-pixel precision, for example.

The scaling block 220 may comprise suitable logic, circuitry and/or code that may be enabled to scale the generated motion vectors for interpolated or inserted pictures. The pixel motion vector generation block 219 may be enabled to generate pixel motion vectors, for example, using a local adaptive non-linear filter. The motion estimation block 216 may be enabled to measure the local motion vector consistency value.

The MVCCM block 222 may comprise suitable logic, circuitry and/or code that may be enabled to measure the extracted quantized residue data and the quantization level. The MVCCM block 222 may be enabled to generate a motion vector consistency value by comparing adjacent block motion vectors and motion-compensated block boundary pixel differences. For example, smaller quantization levels with less residue data may result in higher motion vector confidence while larger quantization levels and higher residue data may generate lower motion vector confidence. The MVCCM block 222 may be enabled to generate a motion vector confidence value and a motion vector consistency value to the non-linear filtering block 228.

The motion compensated interpolation block 224 may comprise suitable logic, circuitry and/or code that may be enabled to utilize the scaled local and global motion vectors and the noise reduced decoded pictures to generate the interpolated or inserted pictures. The motion compensated interpolation block 224 may be enabled to pass the generated interpolated pictures to the non-linear filtering block 228.

The non-linear filtering block 228 may comprise suitable logic, circuitry and/or code that may be enabled to filter the received interpolated pictures to reduce artifacts in the final output interpolated pictures. The non-linear filtering block 228 may be enabled to utilize the motion vector confidence and consistency measurement value to determine whether motion compensated interpolation is likely to fail. If the non-linear filtering block 228 determines that the motion compensated interpolation is likely to fail, the PRUC engine 204 may be enabled to switch off picture interpolation across scene changes and continue repeating previous pictures.

In operation, the decompression engine 202 may be enabled to receive compressed video streams comprising low picture rates and decompress the received compressed video streams. The PRUC engine 204 may be enabled to perform PRUC using motion vectors and other coding information extracted from the compressed video streams. The PRUC engine 204 may be enabled to generate high picture rate interpolated pictures in progressive scanning for display on a modern video display screen, for example, LCD screen or PDP screen.

Digital video compression algorithms, for example, MPEG-2, MPEG-4, VC1 and VP6 may allow forward and backward predictive and bidirectional predictive coding that may result in the generation of P and B pictures respectively. Motion compensated predictive coding may be enabled to exploit the temporal correlation between consecutive pictures. The video compression encoder 118 may generate motion vectors (MV) between pictures within an allowed temporal window. These motion vectors may be utilized for motion compensation in video compression encoding and decoding processes. In the compressed video stream, the motion compensated information, for example, macroblocks may comprise coded motion vector data and transformed residual data.

An artifact known as motion judder may result when the picture rate of a video stream is low. Motion judder may be due to the temporal sampling rate being low to accurately describe motion in a scene. The motion compensated interpolation block 224 may be enabled to reduce motion judder. The motion compensated interpolation block 224 may be enabled to modify the processing of a picture rate converter so that it may follow moving objects similar to the human eye. The picture may appear clean and sharp as it moves without the motion judder. The PRUC engine 204 may be enabled to analyze a stream of input pictures to identify each object in the scene to determine how the object may be moving. The PRUC engine 204 may be enabled to interpolate the location of the plurality of objects at different time instants to generate each output picture.

The PRUC engine 204 may be enabled to interpolate additional intermediate pictures between coded pictures instead of repeating earlier coded pictures. Motion compensated interpolation may be similar to the generation of predicted pictures, for example, P pictures and B pictures during video compression. In accordance with an embodiment of the invention, the PRUC engine 204 may not require the transmission of motion vector and residual data to generate one or more interpolated pictures. One or more display devices may perform their own PRUC from the compressed video stream with no additional information other than receiving decoded pictures.

A plurality of interpolated motion vectors may be utilized for isolated macroblocks without motion vectors, for example, intra macroblocks. In accordance with an embodiment of the invention, the PRUC engine 204 may be enabled to switch-off frame interpolation across scene changes and repeat the previous frame. The non-linear filtering block 228 may be enabled to utilize motion adaptive weighted median filtering, for example, to generate interpolated pictures between an I picture and a previous P picture.

Figure 3:
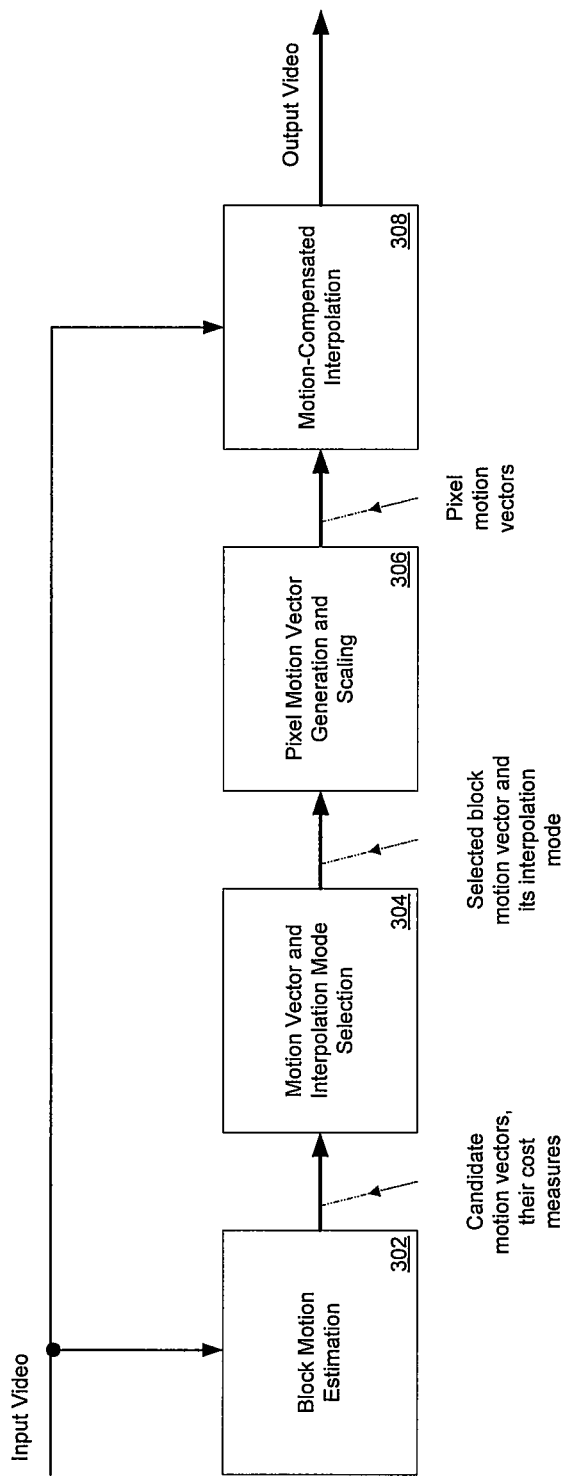
FIG. 3 is a block diagram of an exemplary picture rate up-conversion system, in accordance with an embodiment of the invention.

FIG. 3 is a block diagram of an exemplary picture rate up-conversion system, in accordance with an embodiment of the invention. Referring to FIG. 3, there is shown a block motion estimation block 302, a motion vector and interpolation mode selection block 304, a pixel motion vector generation and scaling block 306 and a motion compensated interpolation block 308.

The block motion estimation block 302 may comprise suitable logic, circuitry and/or code that may be enabled to receive input video data and generate one or more forward motion vectors and one or more backward motion vectors based on extracted picture rate up-conversion (PRUC) data. The block motion estimation block 302 may be enabled to calculate a cost of performing motion estimation of a particular block or pixel, along the generated forward motion vectors and the generated backward motion vectors corresponding to the particular block or pixel. The motion vector with the least cost may be selected.

The input video data may be a video sequence at a picture rate of X Hz, for example. The output generated may be a video sequence at a picture rate of Y Hz, for example, where Y>X and Y may match the display picture rate. The block motion estimation block 302 may be enabled to utilize a motion vector search algorithm to track motion of objects from one picture to the next picture. The block motion estimation block 302 may be enabled to split local and global motion search functions in order to generate candidate motion vectors and their corresponding cost measures.

In accordance with an embodiment of the invention, if a picture does not correspond to a scene change, each block in the picture may be associated with a local motion vector ($v_x$, $v_y$). These local motion vectors, which may have sub-pixel resolution, may be combined together to build a vector field. The local motion search function may determine the forward and backward motion vectors for a given block location, where each vector may have a corresponding cost, for example, sum of absolute differences (SAD). Notwithstanding, the block size for motion estimation may vary, for example, 4×4 or 8×8.

For example, in a scene where a camera follows an airplane flying over a cloudy sky. The global motion may comprise a pan of the camera as it follows the airplane, and the airplane itself may be the object where motion may differ from global motion. A global motion vector may be derived based on a measure of global motion by collecting statistics, for example, a histogram of local motion vectors. Alternatively, the global motion vector may be approximated based on a pixel transformation, such as:

$$v_x = a_{11}x + a_{12}y + b_1$$

$$v_y = a_{21}x + a_{22}y + b_2$$

where (x,y) and ($v_x$, $v_y$) may indicate the position and motion, respectively. The parameters $a_{11}$, $a_{12}$, $b_1$ and $a_{21}$, $a_{22}$, $b_2$ may be estimated by local motion vector samples using a least squares method, for example.

The motion vector and interpolation mode selection block 304 may comprise suitable logic, circuitry and/or code that may be enabled to select one of the generated forward motion vectors when the calculated cost of performing motion estimation of the particular block or pixel along a generated forward motion vector is less than the calculated cost of performing motion estimation of the particular block or pixel along a generated backward motion vector. The motion vector and interpolation mode selection block 304 may be enabled to adaptively determine an interpolation mode for applying the selected motion vector.

The pixel motion vector generation and scaling block 306 may comprise suitable logic, circuitry and/or code that may be enabled to scale the selected forward motion vector or backward motion vector and generate a pixel motion vector. The pixel motion vector generation and scaling block 306 may be enabled to map the block motion vector to each pixel of an interpolated picture using linear or non-linear filtering.

The motion compensated interpolation block 308 may comprise suitable logic, circuitry and/or code that may be enabled to motion compensate the selected forward motion vector or backward motion vector to generate a plurality of interpolated pictures.

Figure 4A:
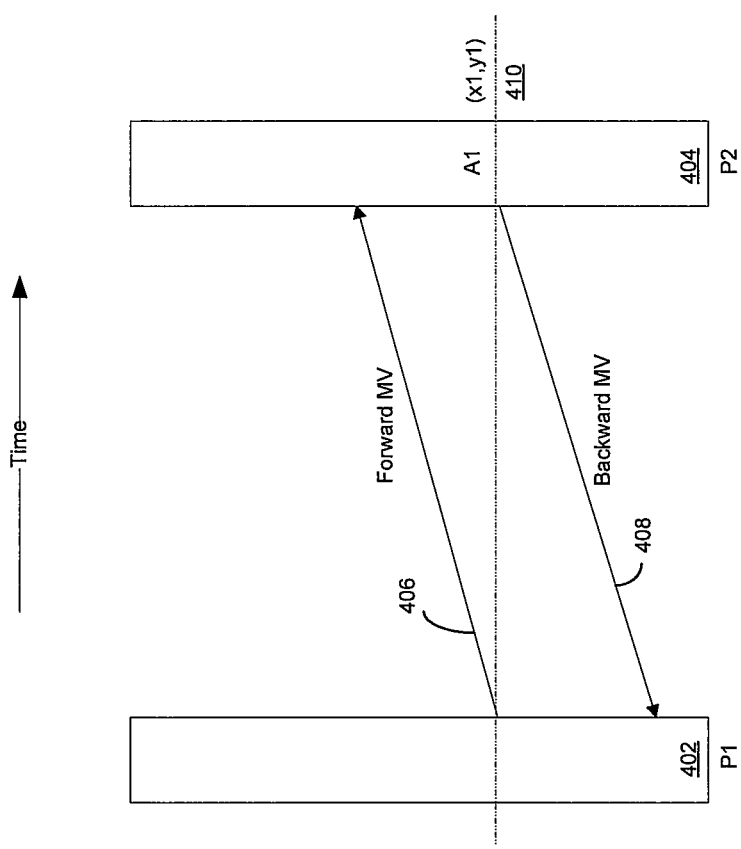
FIG. 4A is a block diagram illustrating exemplary forward and backward motion vectors corresponding to a block using adjacent pictures, in accordance with an embodiment of the invention.

FIG. 4A is a block diagram illustrating exemplary forward and backward motion vectors corresponding to a block using adjacent pictures, in accordance with an embodiment of the invention. Referring to FIG. 4A, there is shown a plurality of adjacent original pictures, for example, P1 402 and P2 404, a forward motion vector 406 corresponding to pixel A1 (x1,y1) 410 and a backward motion vector corresponding to pixel A1 (x1,y1) 410. In accordance with an embodiment of the invention, a spatial horizontal dimension may extend out of the page.

The block motion estimation block 302 may be enabled to generate the forward motion vector 406 and the backward motion vector 408 based on extracted picture rate up-conversion (PRUC) data. The block motion estimation block 302 may be enabled to calculate a cost of performing motion estimation of a particular pixel, for example, A1 410 along the generated forward motion vector 406 and the generated backward motion vector 408 corresponding to the particular pixel A1 410. The motion vector with the least cost may be selected.

In accordance with an embodiment of the invention, when video is recorded using a moving camera, the regions of a picture close to its borders may have less reliable motion vectors than those closer to the middle of the region. In instances where an object appears in a scene that may not be seen in the previous picture P1 402, it may be difficult to find a reference for the backward motion vector 408 in the previous picture P1 402. Similarly, if an object disappears from a scene and may not be seen in a next picture P2 404, it may be difficult to find a reference for the forward motion vector 406 in the next picture P2 404.

Figure 4B:
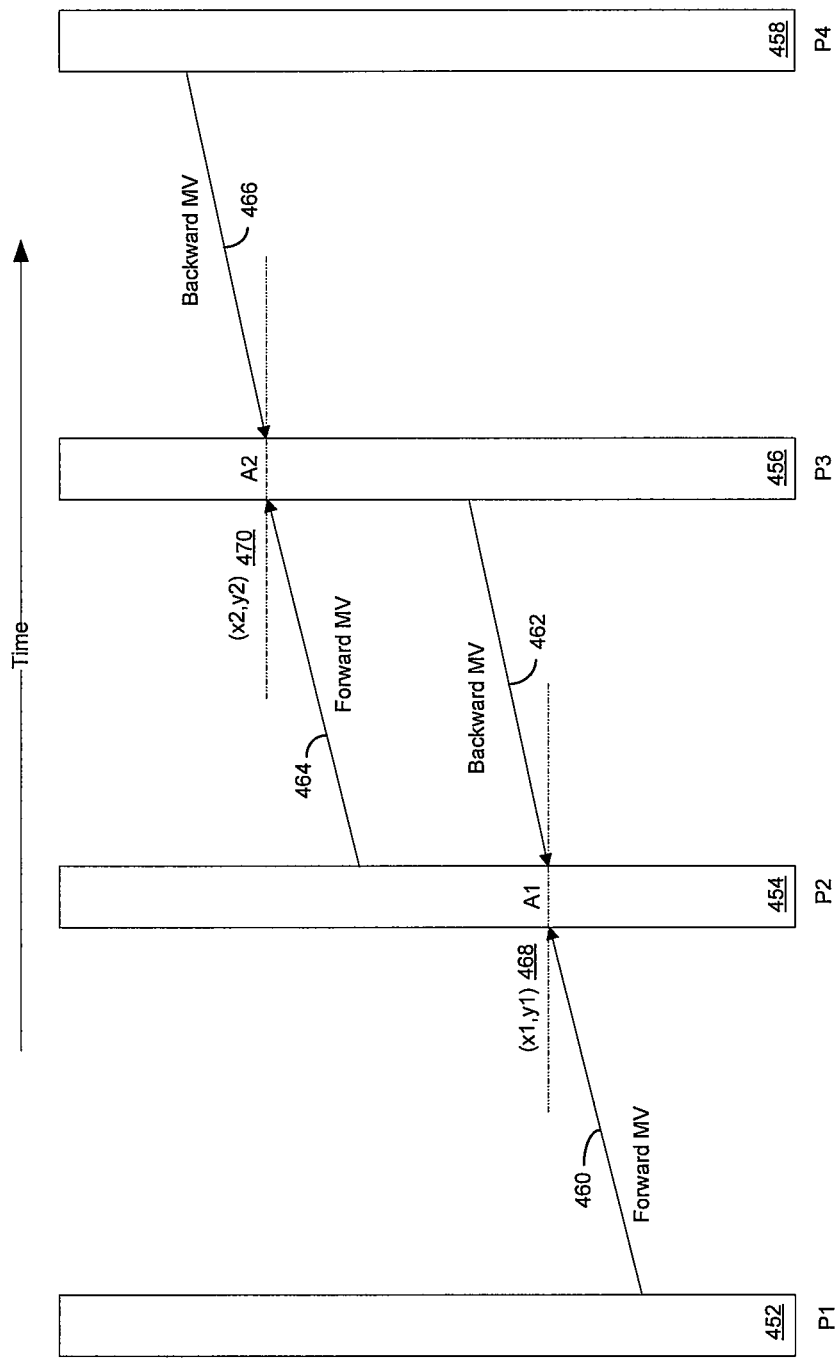
FIG. 4B is a block diagram illustrating exemplary forward and backward motion vectors corresponding to a block using a plurality of adjacent pictures, in accordance with an embodiment of the invention.

FIG. 4B is a block diagram illustrating exemplary forward and backward motion vectors corresponding to a block using a plurality of adjacent pictures, in accordance with an embodiment of the invention. Referring to FIG. 4B, there is shown a plurality of adjacent original pictures, for example, P1 452, P2 454, P3 456 and P4 458. The forward motion vector 460 and backward motion vector 462 may correspond to pixel A1 (x1,y1) 468. The forward motion vector 464 and backward motion vector 466 may correspond to pixel A2 (x1,y1) 470. In accordance with an embodiment of the invention, a spatial horizontal dimension may extend out of the page.

The block motion estimation block 302 may be enabled to generate the forward motion vectors 460 and 464 and backward motion vectors 462 and 466 based on extracted PRUC data. The block motion estimation block 302 may be enabled to calculate a cost of performing motion estimation of a particular pixel, for example, A1 468 along the generated forward motion vector 460 and the generated backward motion vector 462 corresponding to the particular pixel A1 468. The motion vector with the least cost may be selected. The plurality of forward motion vectors 460 and 464 and backward motion vectors 462 and 466 may be searched using four original adjacent pictures P1 452, P2 454, P3 456 and P4 458. The motion vector search between original pictures P2 454 and P3 456 may consider any of the four motion vectors, for example, forward motion vectors 460 and 464 and backward motion vectors 462 and 466 as potential motion vector candidates.

Figure 5A:
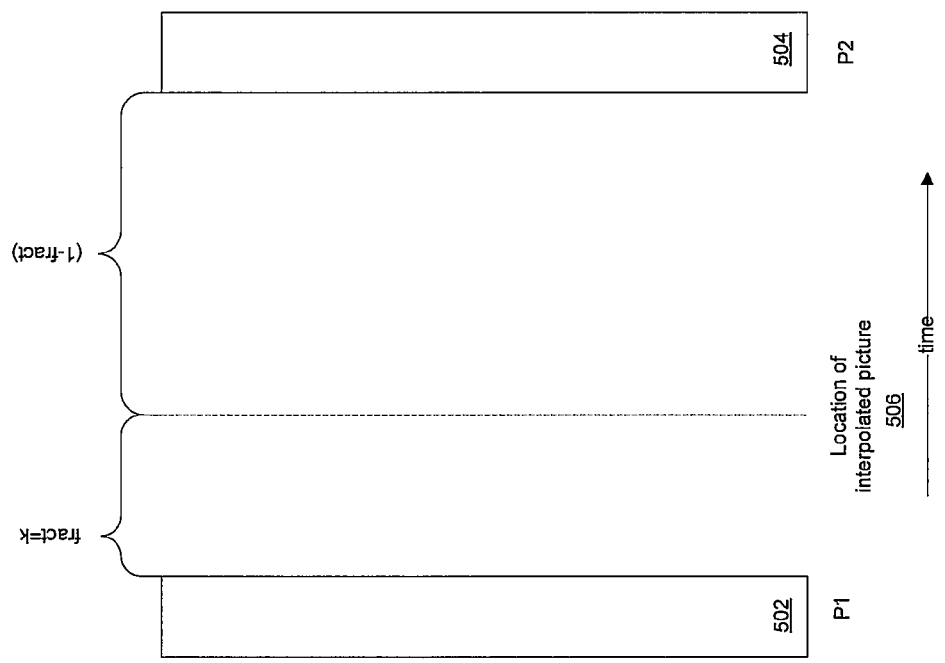
FIG. 5A is a block diagram illustrating insertion of an exemplary interpolated picture between two pictures, in accordance with an embodiment of the invention.

FIG. 5A is a block diagram illustrating insertion of an exemplary interpolated picture between two pictures, in accordance with an embodiment of the invention. Referring to FIG. 5A, there is shown a plurality of coded pictures, for example, P1 502 and P2 504 and the location of an interpolated picture 506. For example, the interpolated picture 506 may be inserted k time units from the coded picture P1 502.

Figure 5B:
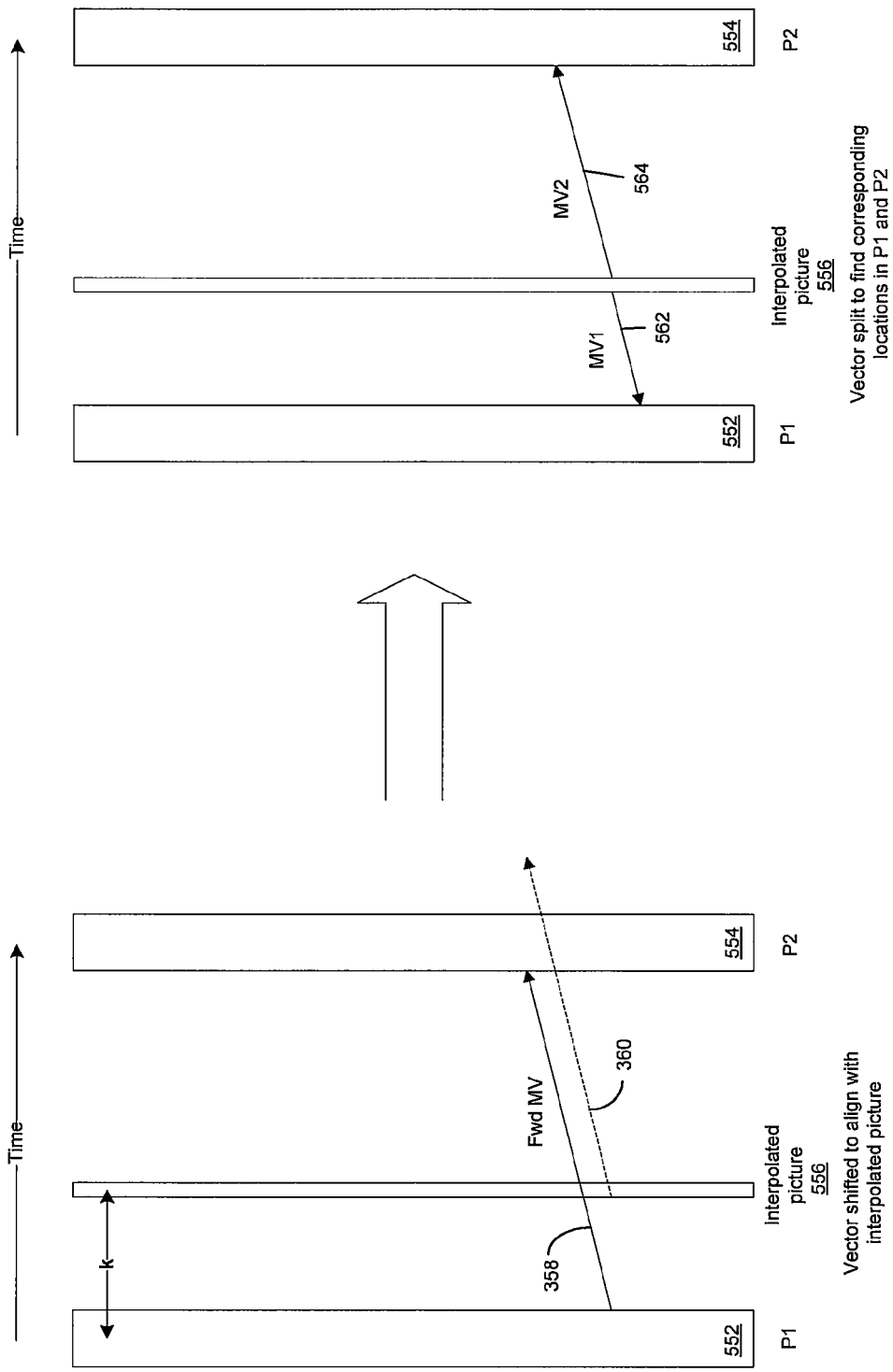
FIG. 5B is a block diagram illustrating exemplary motion vectors of an interpolated picture, in accordance with an embodiment of the invention.

FIG. 5B is a block diagram illustrating exemplary motion vectors of an interpolated picture, in accordance with an embodiment of the invention. Referring to FIG. 5B, there is shown a plurality of coded pictures, for example, P1 552 and P2 554 and an interpolated picture 556. For example, the interpolated picture 556 may be inserted k time units from the coded picture P1 552.

A motion vector 558 may point from an area in the previous picture P1 552 to an area in the next picture P2 554, in such a way that the motion vector 558 may capture the motion that occurred between the two original pictures P1 552 and P2 554. The motion vector 560 may be a shifted version of motion vector 558. The motion vector 560 may be shifted to align with the interpolated picture 556.

The motion vector 560 may be split into two motion vectors, for example, MV1 562 and MV2 564. Each of the estimated motion vectors, for example, motion vector 560 may be split and scaled for motion compensated interpolation. The directions of the two scaled motion vectors, for example, MV1 562 and MV2 564 may be opposite to each other. The length of the scaled motion vector, for example, MV1 562 may be proportional to the temporal difference between the interpolated picture 556 and the original picture P1 552. The length of the scaled motion vector, for example, MV2 564 may be proportional to the temporal difference between the interpolated picture 556 and the original picture P2 554.

Figure 6A:
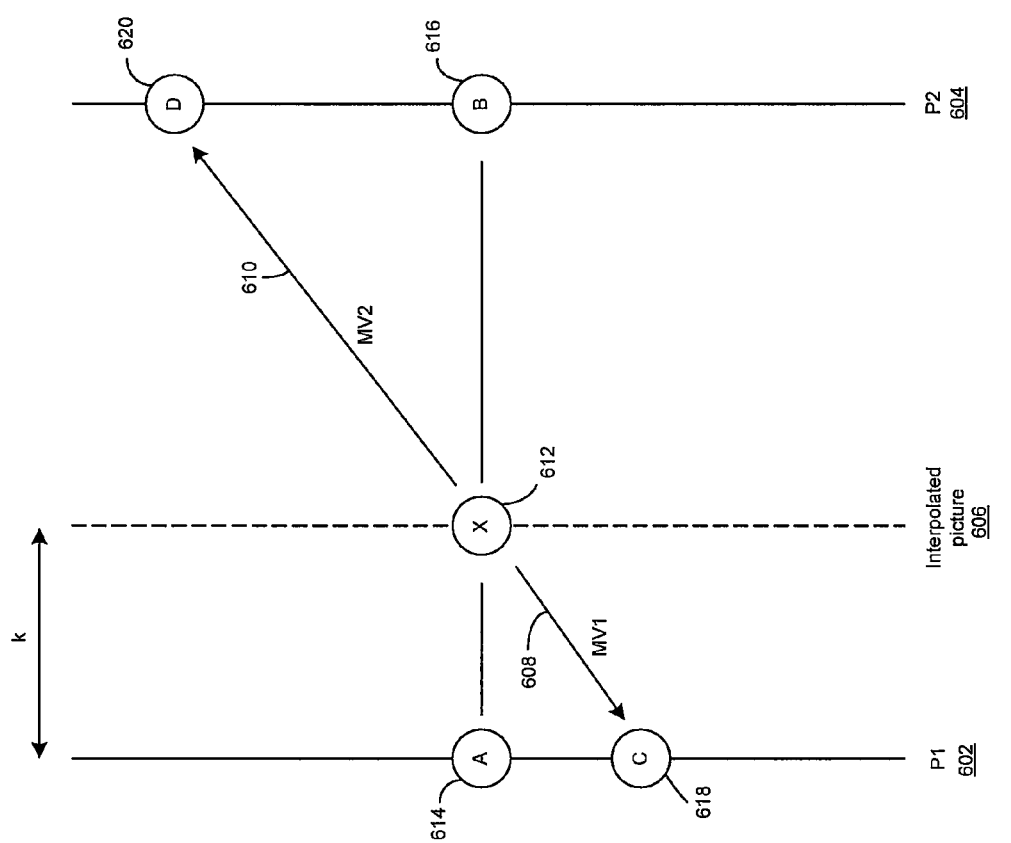
FIG. 6A is a block diagram illustrating exemplary motion-compensated forward and backward motion vectors corresponding to a block using adjacent pictures, in accordance with an embodiment of the invention.

FIG. 6A is a block diagram illustrating exemplary motion-compensated forward and backward motion vectors corresponding to a block using adjacent pictures, in accordance with an embodiment of the invention. Referring to FIG. 6A, there is shown a plurality of pictures, for example, P1 602 and P2 604 and an interpolated picture 606.

The block motion estimation block 302 may be enabled to perform bi-directional motion estimation and select the motion vector with the least cost measurement for a given block or pixel position (x,y). The selected forward motion vector 406 may be forward and backward projected onto adjacent pictures P1 602 and P2 604 using a fraction value fract=k to generate a plurality of motion vectors in sub-pel resolution. For example, the motion vector MV2 610 may be generated according to the following equations:

$$mv2\_x = (1-k)*fwd\_mv\_x \text{ and } mv2\_y = (1-k)*fwd\_mv\_y,$$

where fwd_mv_x and fwd_mv_y may represent x and y components of the selected forward motion vector 406 respectively. Similarly, the motion vector MV1 608 may be generated according to the following equations:

$$mv1\_x = mv2\_x - fwd\_mv\_x \text{ and } mv1\_y = mv2\_y - fwd\_mv\_y.$$

The motion compensated interpolation block 308 may be enabled to perform motion compensation at each pixel location. The current pixel (x,y) may be indicated by pixel X 612 in the interpolated picture 606. The pixel A 614 may indicate a non-motion compensated pixel from previous picture P1 602. The pixel B 616 may indicate a non-motion compensated pixel from next picture P2 604. The pixel C 618 may indicate the motion compensated pixel with sub-pixel resolution from previous picture P1 602. The pixel C 618 may be represented as:

$$PIX\_C = P1(x+mv1\_x, y+mv1\_y)$$

where mv1_x and mv1_y may indicate x and y components of MV1 608. The pixel D 620 may indicate the motion compensated pixel with sub-pixel resolution from next picture P2 604. The pixel D 620 may be represented as:

$$PIX\_D = P2(x+mv2\_x, y+mv2\_y)$$

where mv2_x and mv2_y may indicate x and y components of MV2 610.

The pixel X 612 may be generated at the boundary regions using one of pixel C 618 and pixel D 620. If the forward motion vector 406 is selected, pixel D 620 may be used for predicting pixel X 612. If the backward motion vector 408 is selected, pixel C 618 may be used for predicting pixel X 612.

Figure 6B:
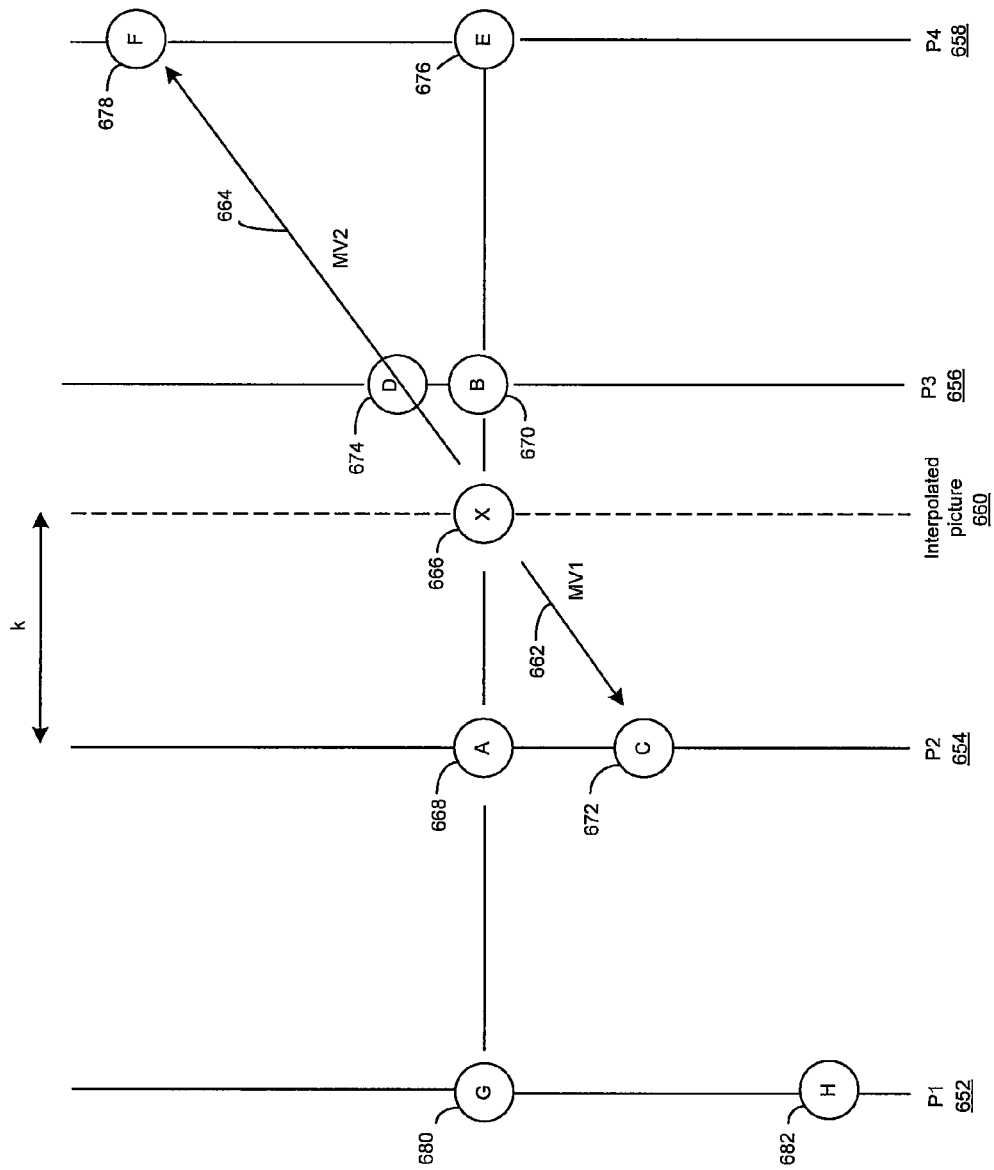
FIG. 6B is a block diagram illustrating exemplary motion-compensated forward and backward motion vectors corresponding to a block using a plurality of adjacent pictures, in accordance with an embodiment of the invention.

FIG. 6B is a block diagram illustrating exemplary motion-compensated forward and backward motion vectors corresponding to a block using a plurality of adjacent pictures, in accordance with an embodiment of the invention. Referring to FIG. 6B, there is shown a plurality of pictures, for example, P1 652, P2 654, P3 656 and P4 658, and an interpolated picture 660. The pixel X 666 may be in the interpolated picture 660.

There may be four motion vectors, for example, a forward motion vector MV1 from P1 652 to P2 654, a forward motion vector MV2 from P2 654 to P3 656, a backward motion vector MV3 from P3 656 to P2 654 and a backward motion vector MV4 from P4 658 to P3 656 corresponding to a boundary block between pictures P2 654 and P3 656. If forward motion vector MV1 from P1 652 to P2 654, pixel H 682 may be used for predicting pixel X 666. If forward motion vector MV2 from P2 654 to P3 656 is selected, pixel C 672 may be used for predicting pixel X 666. If backward motion vector MV3 from P3 656 to P2 654 is selected, pixel D 674 may be used for predicting pixel X 666. If backward motion vector MV4 from P4 658 to P3 656 is selected, pixel F 678 may be used for predicting pixel X 666.

The block motion estimation block 302 may be enabled to perform bi-directional motion estimation and select the motion vector with the least cost measurement for a given block or pixel X 616 with a pixel position (x,y). The selected motion vector may be forward and backward projected onto two of the plurality of adjacent pictures, for example, P2 654 and P4 658 using a fraction value fract=k to generate a plurality of motion vectors in sub-pel resolution. For example, the motion vector MV2 662 may be generated according to the following equations:

$$mv2\_x = (1-k)*fwd\_mv\_x \text{ and } mv2\_y = (1-k)*fwd\_mv\_y,$$

where fwd_mv_x and fwd_mv_y may represent x and y components of the selected motion vector respectively. Similarly, the motion vector MV1 664 may be generated according to the following equations:

$$mv1\_x = mv2\_x - fwd\_mv\_x \text{ and } mv1\_y = mv2\_y - fwd\_mv\_y.$$

The motion compensated interpolation block 308 may be enabled to perform motion compensation at each pixel location.

In accordance with an embodiment of the invention, a global motion vector may be generated for a system that may use single directional motion estimation. The width of regions with unreliable motion vectors may depend on the size of global movement. The global motion may be represented as a single forward motion vector for the boundary when the global motion vector points towards, for example, pixel C 618 may be used for predicting pixel X 612. The global motion may be represented as a single forward motion vector for the boundary when the global motion vector points away from, for example, pixel D 620 may be used for predicting pixel X 612.

In accordance with another embodiment of the invention, a plurality of blocks located in a region may use a motion vector calculated from a plurality of closest neighboring blocks that may lie outside the region, if a global motion estimate is not available.

Figure 7:
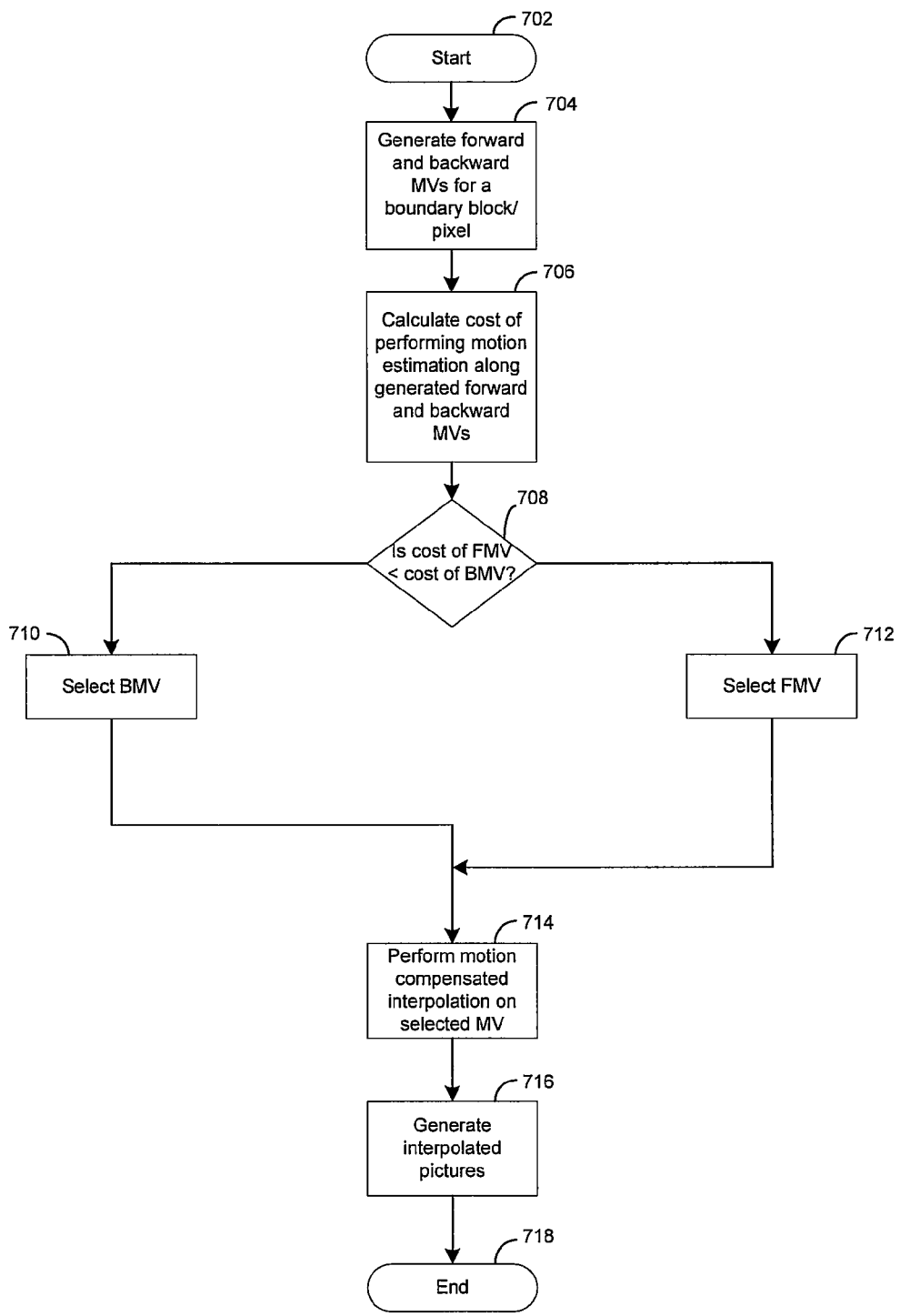

FIG. 7 is a flowchart illustrating exemplary steps for motion-compensated picture rate up-conversion (PRUC) of digital video using picture boundary processing, in accordance with an embodiment of the invention. Referring to FIG. 7, exemplary steps may begin at step 702. In step 704, the block motion estimation block 302 may be enabled to generate one or more forward motion vectors, for example, 460 and 464 and one or more backward motion vectors 462 and 466 based on extracted picture rate up-conversion (PRUC) data. In step 706, the block motion estimation block 302 may be enabled to calculate a cost of performing motion estimation of a particular block or pixel, for example, pixel A1 468 along the generated forward motion vectors, for example, 460 and the generated backward motion vectors, for example, 462 corresponding to the particular block or pixel, for example, pixel A1 468. The particular block and/or pixel, for example, pixel A1 468 may be a boundary block and/or pixel along an outer edge of the generated plurality of interpolated pictures.

In step 708, it may be determined whether the calculated cost of performing motion estimation of the particular block or pixel, for example, pixel A1 468 along the generated forward motion vector 460 is less than the calculated cost of performing motion estimation of the particular block or pixel, for example, pixel A1 468 along the generated backward motion vector 462.

In instances where the calculated cost of performing motion estimation of the particular block or pixel, for example, pixel A1 468 along the generated forward motion vector 460 is less than the calculated cost of performing motion estimation of the particular block or pixel, for example, pixel A1 468 along the generated backward motion vector 462, control passes to step 712. The forward motion vector may be selected with the least cost. Control passes to step 714. In instances where the calculated cost of performing motion estimation of the particular block or pixel, for example, pixel A1 468 along the generated forward motion vector 460 is not less than the calculated cost of performing motion estimation of the particular block or pixel, for example, pixel A1 468 along the generated backward motion vector 462, control passes to step 710. The backward motion vector may be selected with the least cost. Control passes to step 714.

In step 714, the motion compensated interpolation block 308 may be enabled to perform motion compensation on the selected motion vector. In step 716, the motion compensated interpolation block 308 may be enabled to generate a plurality of interpolated pictures. Control then passes to end step 718.

In accordance with an embodiment of the invention, a method and system for motion-compensated picture rate up-conversion (PRUC) of digital video using picture boundary processing may comprise a block motion estimation block 302 that may be enabled to generate one or more forward motion vectors, for example, 460 and 464 and one or more backward motion vectors 462 and 466 based on extracted picture rate up-conversion (PRUC) data. The block motion estimation block 302 may be enabled to calculate a cost of performing motion estimation of a particular block or pixel, for example, pixel A1 468 along the generated forward motion vectors, for example, 460 and the generated backward motion vectors, for example, 462 corresponding to the particular block or pixel, for example, pixel A1 468. The motion vector with the least cost, for example, forward motion vector 460 may be selected and motion compensated to generate a plurality of interpolated pictures. The particular block and/or pixel may be a boundary block and/or pixel along an outer edge of the generated plurality of interpolated pictures.

The motion vector and interpolation mode selection block 304 may be enabled to select one of the generated forward motion vectors, for example, forward motion vector 460 when the calculated cost of performing motion estimation of the particular block or pixel, for example, pixel A1 468 along the generated forward motion vector 460 is less than the calculated cost of performing motion estimation of the particular block or pixel, for example, pixel A1 468 along the generated backward motion vector 462.

The pixel motion vector generation and scaling block 306 may be enabled to scale the selected forward motion vector 460 and generate a pixel motion vector. The motion compensated interpolation block 308 may be enabled to provide motion compensation for the selected forward motion vector 460 so as to generate a plurality of interpolated pictures.

The motion vector and interpolation mode selection block 304 may be enabled to select one of the generated backward motion vectors, for example, backward motion vector 462 when the calculated cost of performing motion estimation of the particular block or pixel, for example, pixel A1 468 along the generated backward motion vector 462 is less than the calculated cost of performing motion estimation of the particular block or pixel, for example, pixel A1 468 along the generated forward motion vector 460.

The pixel motion vector generation and scaling block 306 may be enabled to scale the selected backward motion vector 462 and generate a pixel motion vector. The motion compensated interpolation block 308 may be enabled to provide motion compensation for the selected backward motion vector 462 to generate a plurality of interpolated pictures.

The motion vector and interpolation mode selection block 304 may be enabled to generate a global motion vector based on the global motion. The motion compensated interpolation block 308 may be enabled to provide motion compensation for the generated global motion vector to generate the plurality of interpolated pictures. The motion vector and interpolation mode selection block 304 may be enabled to generate a motion vector based on a plurality of blocks adjacent to the particular block or pixel, for example, pixel A1 468 outside a particular region, if a global motion vector estimate is not available. The motion compensated interpolation block 308 may be enabled to provide motion compensation for the generated motion vector to generate the plurality of interpolated pictures.

The PRUC engine 204 that may be enabled to extract PRUC data from a compressed video data stream while the compressed video data stream is being decompressed by the video decompression engine 202. The PRUC data may comprise local block motion vectors, block coding modes, quantization levels, quantized residual data and/or decoded pictures. The PRUC engine 204 may be enabled to generate a plurality of interpolated pictures based on the extracted PRUC data.

Another embodiment of the invention may provide a machine-readable storage, having stored thereon, a computer program having at least one code section executable by a machine, thereby causing the machine to perform the steps as described herein for motion-compensated picture rate up-conversion (PRUC) of digital video using picture boundary processing.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein. The present invention may be realized in hardware that comprises a portion of an integrated circuit that also performs other functions.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing video data, the method comprising:
    comparing adjacent motion block vectors between two adjacent pictures to generate a motion vector consistency value;
    determining whether motion compensated interpolation is to be performed between the two adjacent pictures based on the generated motion vector consistency value;
    responsive to a negative determination to perform motion compensated interpolation, inserting a copy of a previous picture between the two adjacent pictures;
    responsive to a positive determination to perform motion compensated interpolation, generating one or more forward motion vectors and one or more backward motion vectors corresponding to a particular block in a boundary region between the two adjacent pictures, based on extracted picture rate up-conversion (PRUC) data;
    calculating a cost of performing motion estimation of said particular block in said boundary region along said generated one or more forward motion vectors and said generated one or more backward motion vectors corresponding to said particular block; and
    generating a plurality of interpolated pictures in said boundary region between said two adjacent pictures based on a least cost associated with one of the motion vectors.

2. The method according to claim 1, comprising selecting one of: said generated one or more forward motion vectors when said calculated cost of performing said motion estimation of said particular block in said boundary region along said generated one or more forward motion vectors is less than said calculated cost of performing said motion estimation of said particular block in said boundary region along said generated one or more backward motion vectors.

3. The method according to claim 2, comprising motion compensating said selected said generated one or more forward motion vectors to generate said plurality of interpolated pictures.

4. The method according to claim 1, comprising selecting one of: said generated one or more backward motion vectors when said calculated cost of performing said motion estimation of said particular block in said boundary region along said generated one or more backward motion vectors is less than said calculated cost of performing said motion estimation of said particular block in said boundary region along said generated one or more forward motion vectors.

5. The method according to claim 4, comprising motion compensating said selected generated one or more backward motion vectors to generate said plurality of interpolated pictures.

6. The method according to claim 1, comprising motion compensating a generated global motion vector based on single directional motion estimation to generate said plurality of interpolated pictures.

7. The method according to claim 6, comprising generating a motion vector based on a plurality of blocks adjacent to said particular block in said boundary region when said generated global motion vector is not available.

8. The method according to claim 7, wherein the adjacent plurality of blocks are located outside the boundary region.

9. The method according to claim 1, wherein the particular block comprises a block located along an outer edge of pictures associated with the video data.

10. A system for processing video data, the system comprising:
    one or more circuits that are operable to compare adjacent motion block vectors between two adjacent pictures to generate a motion vector consistency value;
    said one or more circuits are operable to determine whether motion compensated interpolation is to be performed between the two adjacent pictures based on the generated motion vector consistency value;
    said one or more circuits are operable to, responsive to a negative determination to perform motion compensated interpolation, insert a copy of a previous picture between the two adjacent pictures;
    said one or more circuits are operable to, responsive to a positive determination to perform motion compensated interpolation, generate of one or more forward motion vectors and one or more backward motion vectors corresponding to a particular block in a boundary region between the two adjacent pictures, based on extracted picture rate up-conversion (PRUC) data;
    said one or more circuits are operable to calculate of a cost of performing motion estimation of said particular block in said boundary region along said generated one or more forward motion vectors and said generated one or more backward motion vectors corresponding to said particular block; and
    said one or more circuits are operable to generate of a plurality of interpolated pictures in said boundary region between said two adjacent pictures based on a least cost associated with one of the motion vectors.

11. The system according to claim 10, wherein said one or more circuits are operable to select one of: said generated one or more forward motion vectors when said calculated cost of performing said motion estimation of said particular block in said boundary region along said generated one or more forward motion vectors is less than said calculated cost of performing said motion estimation of said particular block in said boundary region along said generated one or more backward motion vectors.

12. The system according to claim 11, wherein said one or more circuits are operable to motion compensate said selected said generated one or more forward motion vectors to generate said plurality of interpolated pictures.

13. The system according to claim 10, wherein said one or more circuits are operable to select one of: said generated one or more backward motion vectors when said calculated cost of performing said motion estimation of said particular block in said boundary region along said generated one or more backward motion vectors is less than said calculated cost of performing said motion estimation of said particular block in said boundary region along said generated one or more forward motion vectors.

14. The system according to claim 13, wherein said one or more circuits are operable to motion compensate said selected said generated one or more backward motion vectors to generate said plurality of interpolated pictures.

15. The system according to claim 10, wherein said one or more circuits are operable to motion compensate a generated global motion vector based on single directional motion estimation to generate said plurality of interpolated pictures.

16. The system according to claim 15, wherein said one or more circuits are operable to generate a motion vector based on a plurality of blocks adjacent to said particular block in said boundary region when said generated global motion vector is not available.

17. A non-transitory machine-readable storage having stored thereon, a computer program having at least one code section for processing video data, the at least one code section being executable by a machine for causing the machine to perform steps comprising:
  comparing adjacent motion block vectors between two adjacent pictures to generate a motion vector consistency value;
  determining whether motion compensated interpolation is to be performed between the two adjacent pictures based on the generated motion vector consistency value;
  responsive to a negative determination to perform motion compensated interpolation, inserting a copy of a previous picture between the two adjacent pictures;
  responsive to a positive determination to perform motion compensated interpolation, generating one or more forward motion vectors and one or more backward motion vectors corresponding to a particular block in a boundary region between the two adjacent pictures, based on extracted picture rate up-conversion (PRUC) data;
  calculating a cost of performing motion estimation of said particular block in said boundary region along said generated one or more forward motion vectors and said generated one or more backward motion vectors corresponding to said particular block; and
  generating a plurality of interpolated pictures in said boundary region between said two adjacent pictures based on a least cost associated with one of the motion vectors.

18. The non-transitory machine-readable storage according to claim 17, wherein said at least one code section comprises code for selecting one of: said generated one or more forward motion vectors when said calculated cost of performing said motion estimation of said particular block in said boundary region along said generated one or more forward motion vectors is less than said calculated cost of performing said motion estimation of said particular block in said boundary region along said generated one or more backward motion vectors.

19. The non-transitory machine-readable storage according to claim 18, wherein said at least one code section comprises code for motion compensating said selected said generated one or more forward motion vectors to generate said plurality of interpolated pictures.

20. The non-transitory machine-readable storage according to claim 17, wherein said at least one code section comprises code for selecting one of: said generated one or more backward motion vectors when said calculated cost of performing said motion estimation of said particular block in said boundary region along said generated one or more backward motion vectors is less than said calculated cost of performing said motion estimation of said particular block in said boundary region along said generated one or more forward motion vectors.

21. The non-transitory machine-readable storage according to claim 20, wherein said at least one code section comprises code for motion compensating said selected said generated one or more backward motion vectors to generate said plurality of interpolated pictures.

22. The non-transitory machine-readable storage according to claim 17, wherein said at least one code section comprises code for motion compensating a generated global motion vector based on single directional motion estimation to generate said plurality of interpolated pictures.

23. The non-transitory machine-readable storage according to claim 22, wherein said at least one code section comprises code for generating a motion vector based on a plurality of blocks adjacent to said particular block in said boundary region when said generated global motion vector is not available.

* * * * *